US011323758B1

(12) United States Patent
Hegar (10) Patent No.: US 11,323,758 B1
(45) Date of Patent: May 3, 2022

(54) LOSSLESS TRANSPORT STREAM COMPRESSION FROM CONSTANT BITRATE TO VARIABLE BITRATE TO CONSTANT BITRATE

(71) Applicant: Amazon Technologies, Inc., Seattle, WA (US)

(72) Inventor: Ryan Hegar, Happy Valley, OR (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 16/712,762

(22) Filed: Dec. 12, 2019

(51) Int. Cl.
*H04N 21/236* (2011.01)
*H04N 21/2365* (2011.01)
*H04N 21/43* (2011.01)
*H04N 21/234* (2011.01)

(52) U.S. Cl.
CPC ... *H04N 21/23608* (2013.01); *H04N 21/2365* (2013.01); *H04N 21/23424* (2013.01); *H04N 21/23611* (2013.01); *H04N 21/4305* (2013.01)

(58) Field of Classification Search
CPC ......... H04N 21/23608; H04N 21/4305; H04N 21/23611; H04N 21/2365; H04N 21/23424; H04N 21/236; H04J 3/1682; H04L 7/043
See application file for complete search history.

(56) References Cited

U.S. PATENT DOCUMENTS

| 2006/0274737 | A1* | 12/2006 | Liu | H04L 7/043 370/389 |
| 2008/0198876 | A1* | 8/2008 | Stranger | H04J 3/1682 370/474 |
| 2015/0156242 | A1* | 6/2015 | Hwang | H04N 21/236 375/260 |

FOREIGN PATENT DOCUMENTS

WO   WO-0139505 A2 * 5/2001 ....... H04N 21/23608

OTHER PUBLICATIONS

Schulzrinne, H. et al., "RTP: A Transport Protocol for Real-Time Applications", Network Working Group, Request for Comments: 3550, Jul. 2003, pp. 1-89.

* cited by examiner

*Primary Examiner* — Vinncelas Louis
(74) *Attorney, Agent, or Firm* — Nicholson De Vos Webster & Elliott LLP (57) ABSTRACT

Techniques for lossless transport stream compression from constant bitrate to variable bitrate to constant bitrate are described. An exemplary method includes generating elementary stream data from an encoder; receiving the generated elementary stream data in a packetizer; generating a transport stream output in the packetizer; and in a statmux, for consecutive NULL packets generated by the packetizer, counting a number of NULL packets between non-null packets and dropping those NULL packets, modifying a next packet to indicate the number of NULL packets dropped using a field in the next packet, and sending the next packet to a receiver.

19 Claims, 9 Drawing Sheets

LOSSLESS TRANSPORT STREAM COMPRESSION FROM CONSTANT BITRATE TO VARIABLE BITRATE TO CONSTANT BITRATE

BACKGROUND

In some instances, constant bitrate (CBR) transport streams are sent between encoders and their statistical multiplexer (statmux) as opposed to a variable bitrate (VBR) transport stream. The difference between a CBR and VBR transport stream is that a CBR transport stream may include NULL packets to ensure the overall bitrate is constant. The constant bitrate can be measured by taking the timestamps between two consecutive program clock reference timestamps (PCRs) and dividing by the number of bits between them (such as by counting the number of MPEG Transport Stream (MTS) packets and multiplying by some number of bits per packet). Further, the PCR timestamp of any packet in a CBR transport stream can be inferred by finding the PCR of the preceding and next MTS packets and performing linear interpolation between them based on the number of packets between each. A VBR transport stream typically does not carry NULL packets and the bitrate calculation between pairs of PCRs as the values will not be the same.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for providing dynamic statistical multiplexing video bandwidth. A statistical multiplexer (statmux) controls a bitrate at which a set of encoders encode video to maximize video quality while ensuring the statmux can multiplex the multiple programs (each containing audio, video, and data), program specific information (PSI) and/or Digital Video Broadcasting (DVB) service information (SI) tables, and null packets into a constant bitrate (CBR) multiple program transport stream (MPTS).

In some implementations, a statmux is redundantly fed by two or more encoders per program (for high availability). Thus, for a 20 program MPTS there are 40 encoders sending single program transport streams (SPTSes) to the statmux. Further, each encoder may send two SPTSes when Society of Motion Picture and Television Engineers (SMPTE) 2022-7 is used for resiliency due to packet loss. Thus, each statmux would be receiving up to 80 SPTS. When sending a CBR SPTS, the CBR rate is set to the peek rate that the statmux may ever want that program to encode at. For a 1080P 60 frames per second encode that peek rate may be 50 Mbps. Multiplying 50 Mbps by 80 SPTS the total bitrate received by the statmux can be 4 Gbps. Sending and receiving that bandwidth can require special instance types, kernel tuning, and extra cost for inter-zone traffic. Further, since the maximum MPTS output rate is 100 Mbps, no more than 400 Mbps (100 Mbps×2 encoders for redundancy×2 RTP streams for SMPTE 2022-7) is useful payload and the rest is NULL packets used to pad each SPTS to CBR. Unfortunately, the NULL packets cannot simply be discarded and a VBR sent (without NULL information) between the encoders and the statmux because in doing so timing information about the non-NULL packets would be lost. With NULL packets present interpolation can be used to calculate the PCR of a video packet, but when the NULL packets are dropped, and the stream changed to VBR then what is known is that the timestamp of the video PID is somewhere in range between two PCRs.

Detailed herein are embodiments detailing the conversion from a CBR stream to a VBR stream and then the reconstruction of the VBR stream back to a CBR stream from which packet timing can be inferred. In particular, CBR content from encoders is converted to VBR content before transmitting to a statmux and the statmux then reconstructs the VBR content into CBR content. This conversion saves network bandwidth as NULL packets do not need to be sent to maintain a CBR. In some embodiments, a SYNC byte of the MPEG transport stream (MTS) is repurposed to provide a count of NULL packets that were not sent (skipped). Typically, the SYNC byte is a fixed value of 0x47 on the first byte of every 188 byte MTS packet. The SYNC byte is useful for determining MTS packet alignment when the data is read as a byte stream. However, in embodiments detailed below, packets are sent from encoders to a statmux using the real-time transport protocol (RTP) (e.g., RFC 3550). The first payload byte of each RTP packet always contains the start of an MTS packet and, as such, the SYNC byte will not have any use between the encoder and statmux.

Therefore, instead of just dropping NULL packets on the encoder side, a number of consecutive NULL packets that are dropped are tracked, and that number of packets dropped is written using a field (e.g., the SYNC byte) of the next non-NULL packet or, when the count reaches a maximum value (e.g., 255), a packet is sent whether it is another NULL packet or not with the maximum value. In either case, when the number of NULL packets dropped is sent, the counter is reset back to zero.

On the receiver (the statmux), upon receiving a MTS packet, the number of NULL packets dropped is read (e.g., from the SYNC byte) and that number of NULL packets are added back into the stream, and the original field value (e.g., SYNC byte (0x47)) is restored to the packet received. Thus, the original CBR transport stream is fully reconstructed in a lossless fashion and the PCR time of any packet can be accurately determined.

Figure 1:
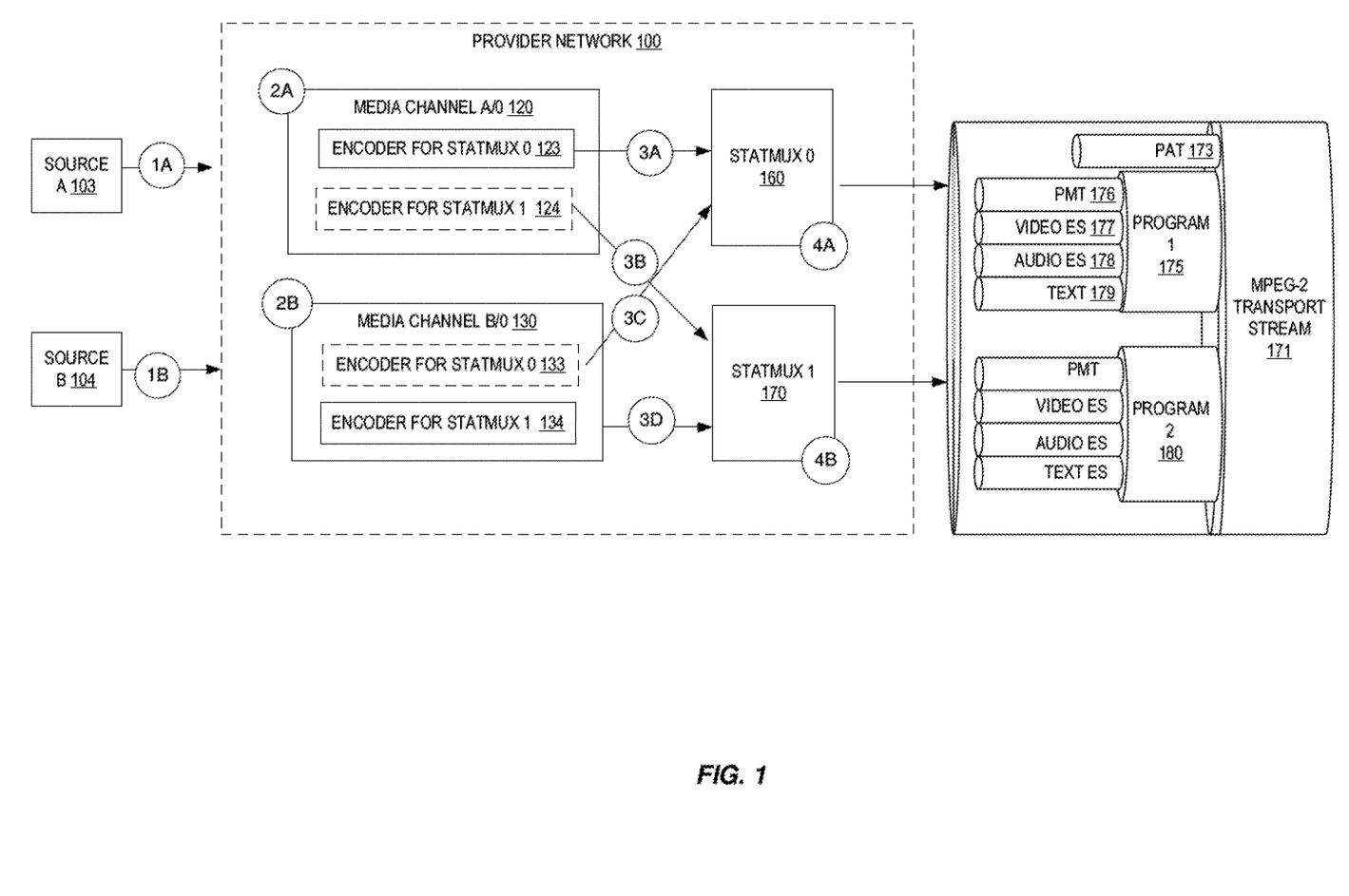
FIG. 1 illustrates embodiments of the generation of a MPTS using a statmux.

FIG. 1 illustrates embodiments of the generation of a MPTS using a statmux. In this example, there are a plurality of upstream sources (source A 103 and source B 104). Examples of an upstream source include, but are not limited to: a streaming camera or appliance that is directly connected to the internet, a contribution encoder that is located in remote location, etc. The content from source A 102 and source B 104 is in a specific package format and protocol. For example, the source content might be available as HTTP Live Streaming (HLS) or transport streaming (TS). The source content contains video, audio, and optional captions streams that are in specific codecs or formats.

One or more media channels (media channel A/0 120 and media channel B/0 130) ingest and transcode content from upstream source A 102 and source B 104 and packages an output which contains a specific combination of elementary stream encodes (video, audio, and data such as captions). Each channel 120, 130 has at least one encoder (shown as encoders 123, 124, 133, and 134) to generate that combination of encodes as a program. Note that encoders 124 and 133 are not active. Each encoder of a channel also generates and provides complexity information (for example, as a complexity packet) for each frame to each statmux. For example, complexity packets may contain a sequence number, encoder identifier, start and end timestamps for the associated frame, and/or a complexity score. This information is used in the statmuxes 160 and 170 for clock recovery, bitrate allocation, and interleaving. Note that in some embodiments, a program is packetized into packetized elementary streams (PESs) using a transport stream packet format which includes a payload and a header (including a sync byte) describing how to process the payload, an identifier of the stream to which the packet belongs (using a packet identifier (PID)), scrambling control bits, adaption field control, and a continuity counter value.

The illustration of FIG. 1 shows media content being provided by source A 103 and source B 104 at circles 1A and 1B to the media channels 120 and 130. The media channels 120 and 130 then encode the media content and generate programs at circles 2A and 2B. Note that the amount of bandwidth to dedicate to video has been provided to the video encoders for each of the media channels.

In some embodiments, audio is muxed into the channel output using a frame buffer model. This means that the bits are spread evenly for a given frame duration and the scheduling deadline is based on a presentation time stamp. Captions, subtitles, and metadata are scheduled immediately.

The programs are output at circles 3A-3D to the statmux 0 160 and statmux 1 170. One or both of the statmuxes 160 and 170 then generate and output a MPTS from the programs at circles 4A and 4B. Note that a MPTS is a multiplexed data stream of one or more programs, where each program has one or more elementary streams such as audio, video, etc. As part of the multiplexed data stream, the MPEG-2 transport 171 stream includes a program association table (PAT) 173 that includes information about the programs 175 and 180 included within the MPEG-2 transport stream 171. In some embodiments, a program includes a program map table (PMT) 176 that includes identifying information of the elementary streams included within the program. The program includes a video elementary stream 177 and a metadata elementary stream. The program may further include an audio elementary stream 178 and/or data (such as a subtitle or captions elementary stream) 179. When the statmuxes 160 and 170 receive a program map table (PMT) from the channel, they are able to determine which PID is associated with the video stream and all of the other PIDs for the elementary stream data should be assumed to be the non-video data. Note that video data also includes overhead that in some embodiments is also considered non-video data.

To facilitate synchronization of the video elementary stream, the metadata elementary streams, and any other available streams that are part of the program 175 and 180, the programs 175 and 180 include a clock reference (CR) and the multiplexed components of the program (video, metadata, audio, etc.) include timing information to indicate when the component should be rendered to the user. The CR can be used to initialize and synchronize the decoders of the various elementary streams to their encoded rate, and the timing information can be used by the decoders to ensure that each decoder renders output (e.g., display of video, playback of audio, display of metadata or visual information based on metadata, etc.) in time with other decoders (e.g., displaying metadata associated with a frame at the same time the frame is displayed).

In some embodiments, a provider network 100 is used. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internal via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) (such as zone 0 110 and zone 1 112) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

Figure 2:
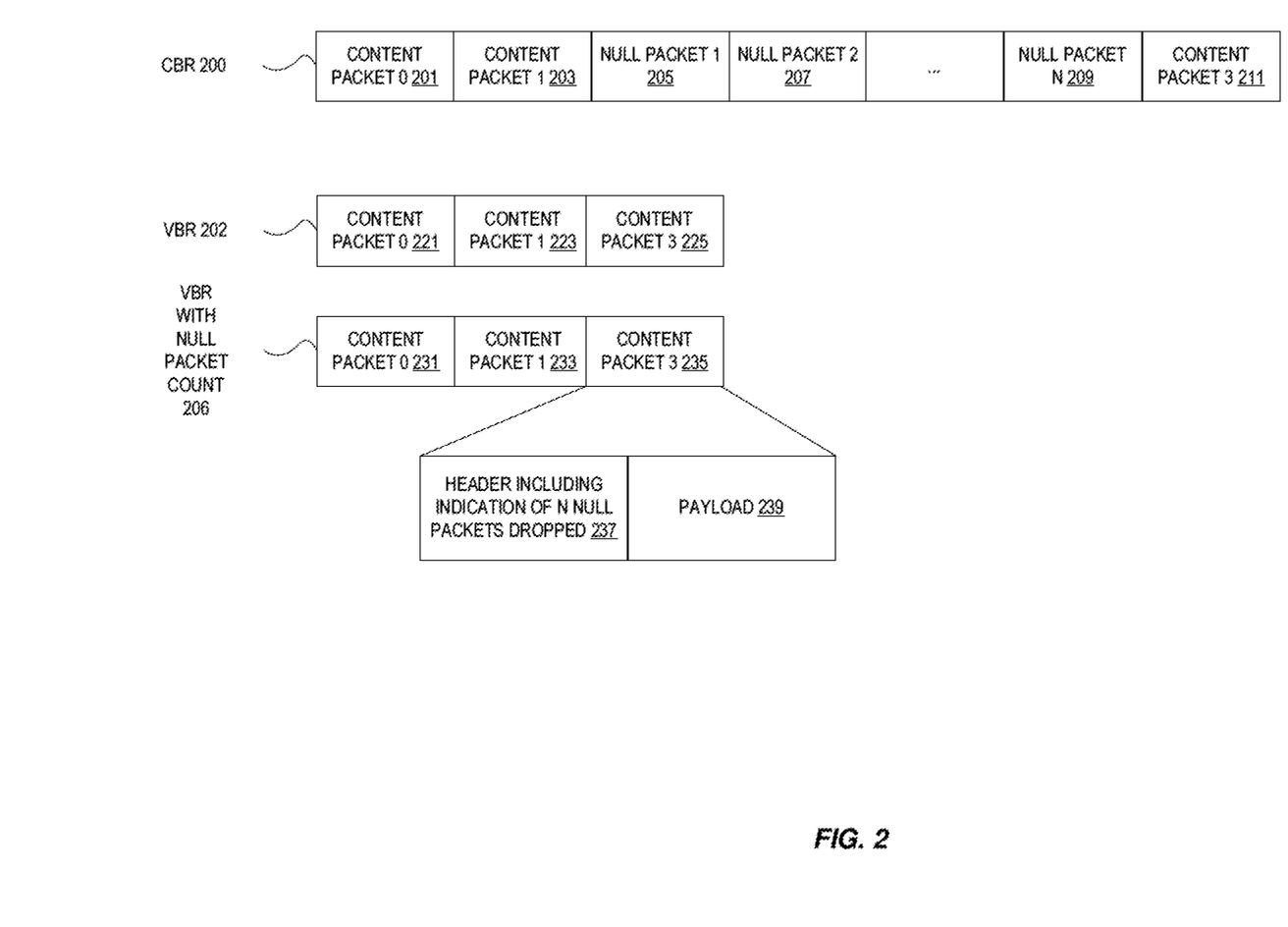
FIG. 2 illustrates examples of CBR and VBR streams.

FIG. 2 illustrates examples of CBR and VBR streams. As shown, a CBR stream 200 includes both content packets (e.g., content packets 201, 203, and 211) containing for example, video, audio, or text for a stream and NULL packets (e.g., packets 205, 207, and 209). The NULL packets are used to ensure the overall bitrate is constant. In the VBR stream 202, the NULL packets are not there and only content packets (e.g., packets 221, 223, and 225) are present. As discussed above, this may cause timing issues.

A VBR stream with a NULL packet count 206 includes content packets 0 231 and content packet 1 233 that correspond to the first two content packets of the CBR stream 200. The third content packet 235 (which corresponds to content packet 3 211 of the CBR stream 200) includes in its header 237 an indication of the N packets (1 to N) dropped from the CBR stream 200 along with a payload 239.

Figure 3:
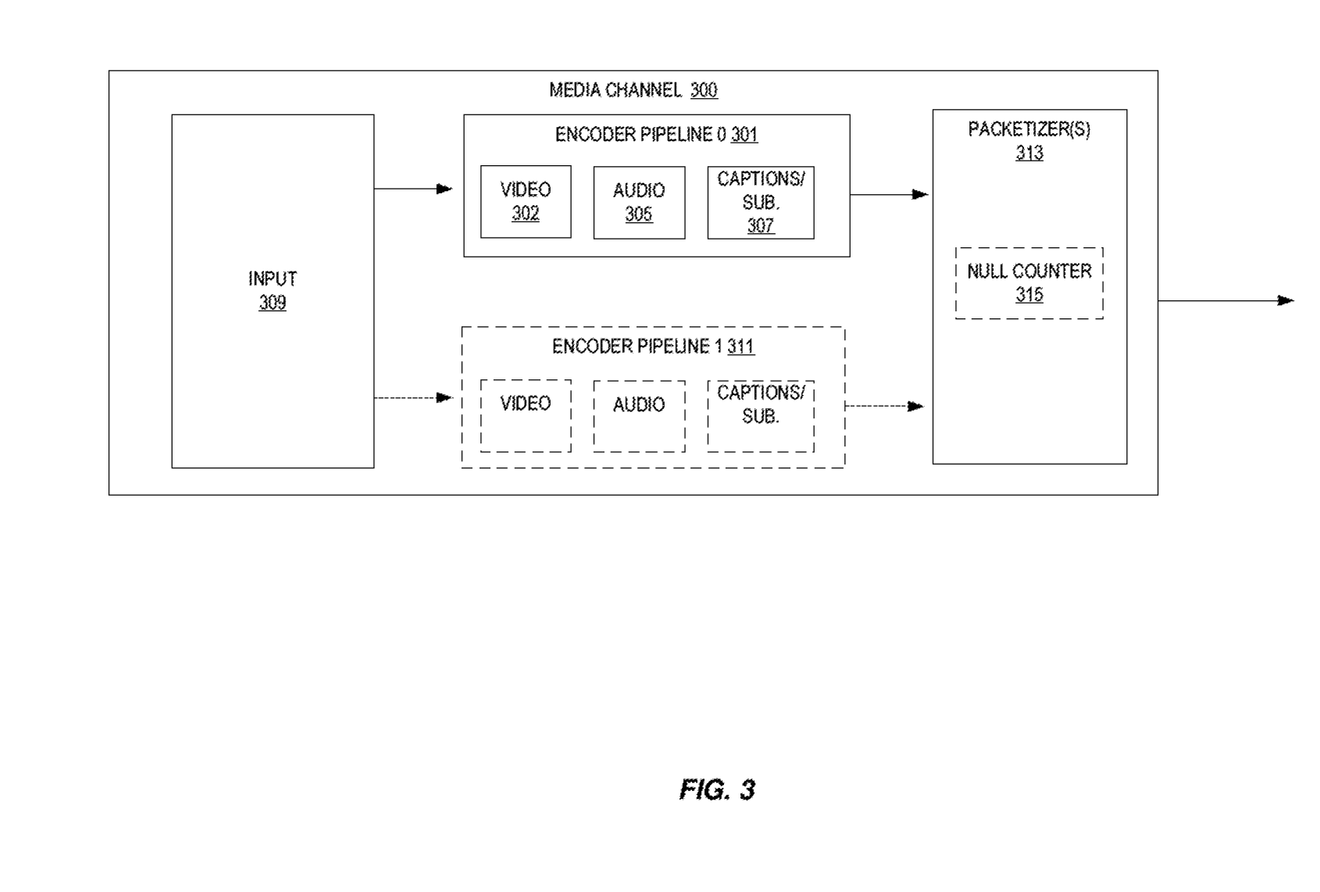
FIG. 3 illustrates embodiments of a media channel.

FIG. 3 illustrates embodiments of a media channel In this example, the media channel 300 includes an input 309 that contains information about how the upstream system and the channel 300 connect to each other. The connection between the input 309 and the upstream system might be a push (the upstream system pushes the content) or a pull (the channel 300 pulls the content from the upstream system).

In this example, there are two encoder pipelines 301 and 311. Each encoder pipeline includes a video encoder 302, an audio encoder 305, and data (e.g., captions, subtitles, etc.) encoder 307. The output of these encoders is a program.

In some embodiments, the encoder pipelines 301 and 311 include a NULL counter 309 which is used to count NULL packets dropped from a CBR stream to be transferred to the statmux, but that need to be reintroduced on the statmux end to recreate the CBR stream (albeit using less bandwidth in the transfer).

In some embodiments, one or more packetizers 313 (which forms the stream to be sent to the statmux) includes a NULL counter 315 to count NULL packets dropped from a CBR stream to generate a VBR stream to be transferred to the statmux. In some embodiments, there is a packetizer per encoder pipeline. In other embodiments, a single packetizer is used for multiple encoder pipelines.

Regardless of the approach, the output of the packetizer(s) 313 is a VBR stream to be sent to the statmux encapsulated in RTP packets.

Figure 4:
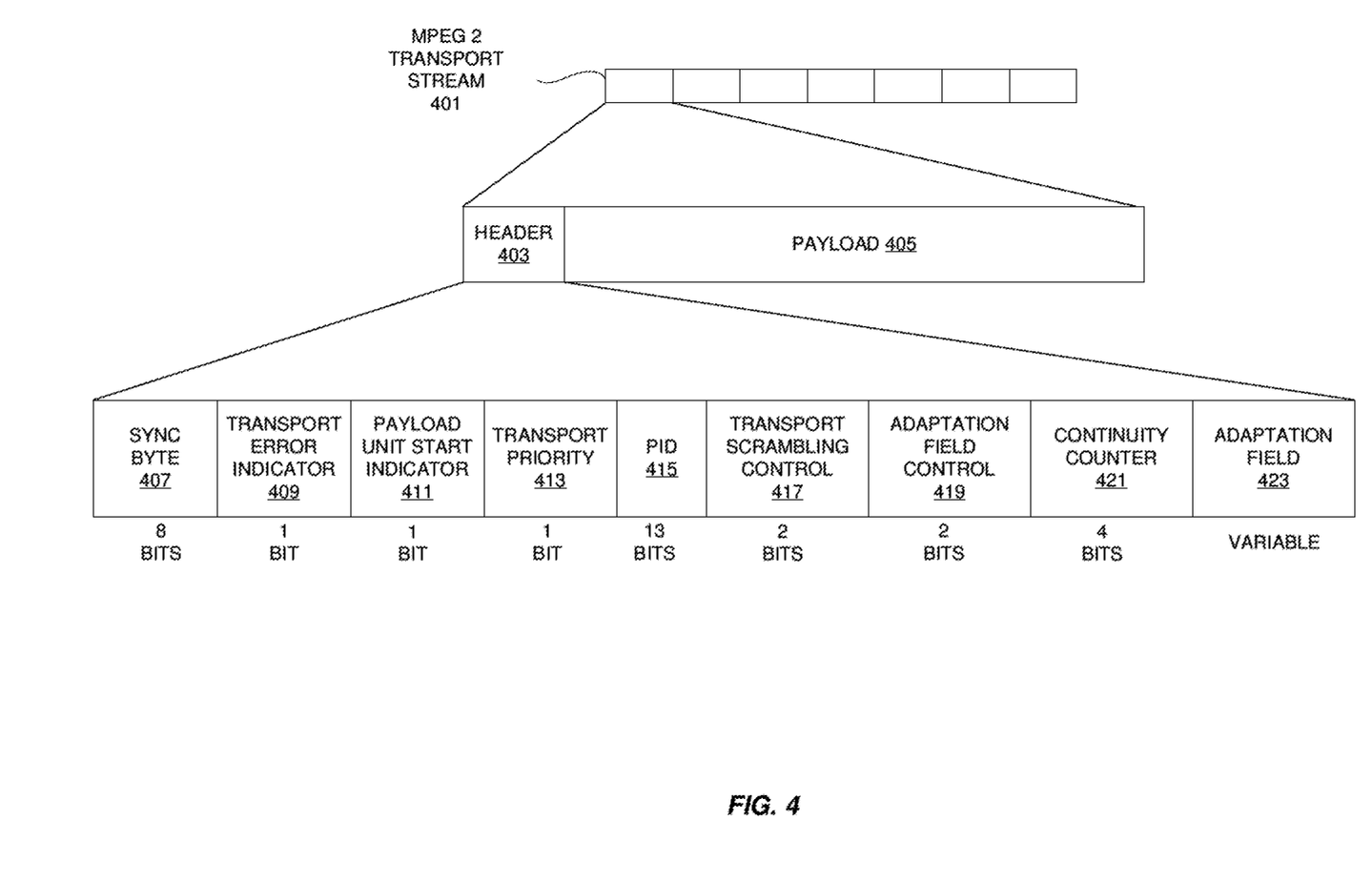
FIG. 4 illustrates an embodiment of a MTS.

FIG. 4 illustrates an embodiment of a MTS. As shown, an MTS packet has a header 403 and a payload 405. The header 403 starts with a synchronization (SYNC) byte 407. By default, this has a value of 0x47. As noted above, when NULL packets are not sent as a part of a MTS (as in packets with a payload 405 has no value or a padded value that the receiver ignores), in some embodiments, the SYNC is used to carry the count of consecutive NULL packets that were skipped.

A set of three flag bits are used to indicate how the payload should be processed. The first flag indicates a transport error 409, the second flag indicates the start of a payload 411, and the third flag indicates transport priority bit 413.

The flags are followed by a 13-bit Packet Identifier 415 which identifies the stream to which the packet belongs (e.g., PES packets corresponding to an elementary stream). The PID 415 allows the receiver to differentiate the stream to which each received packet belongs. Note that 0x1FFF for a PID normally indicates a NULL packet.

The two scrambling control bits 417 are used by conditional access procedures to indicate the encryption of the payload of some TS packets.

Two adaption field control bits 419 describe how the adaptation field 423 is to be used. The adaptation field may include a program clock reference (PCR) or original program clock reference.

A continuity counter 421 indicates a sequence number of the payload packets.

Figure 5:
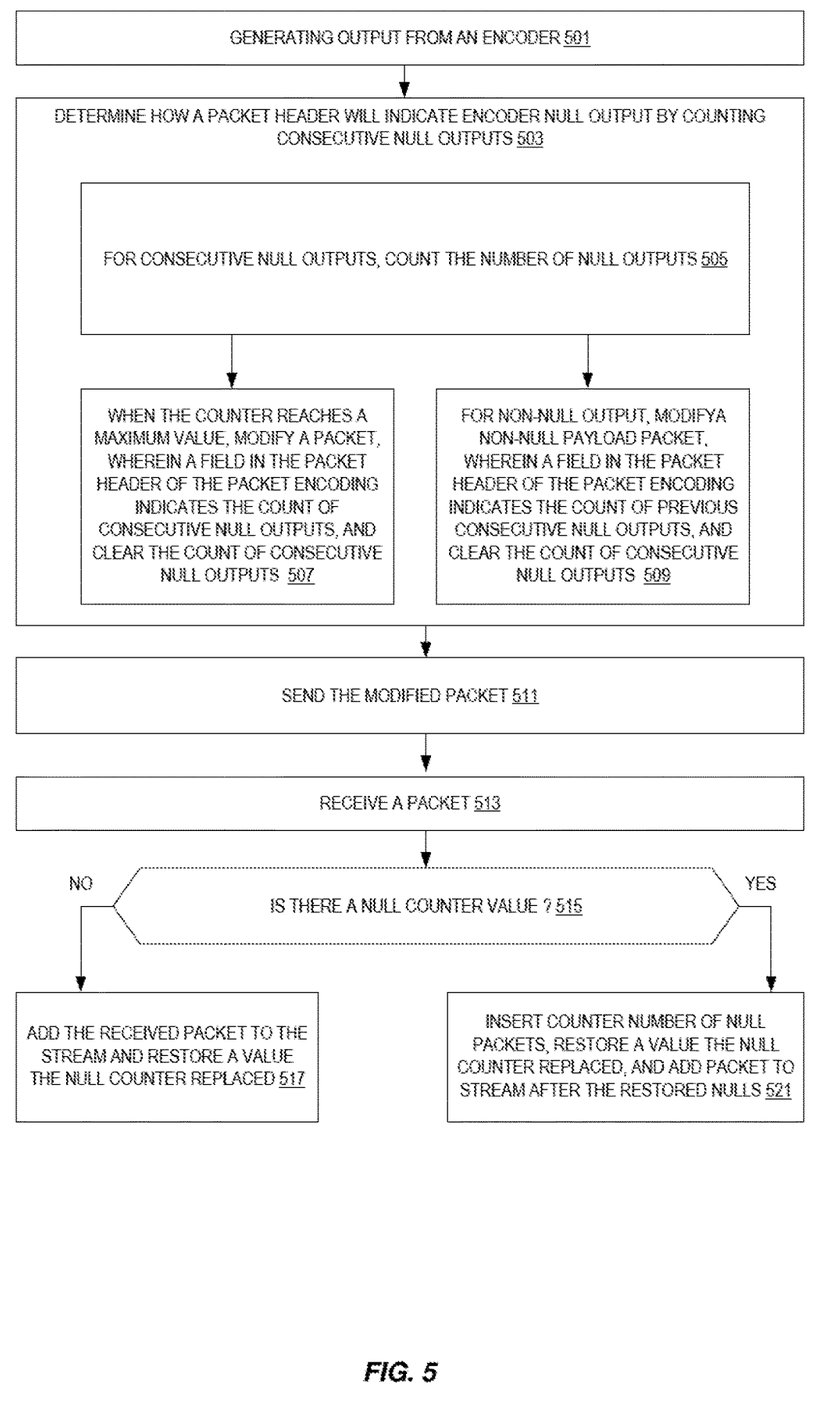
FIG. 5 is a flow diagram illustrating operations of a method for converting a CBR stream to VBR and back to CBR.

FIG. 5 is a flow diagram illustrating operations of a method for converting a CBR stream to VBR and back to CBR. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. the computer-readable storage medium is non-transitory. In some embodiments, one or more (or all) of the operations are performed by the media channels and statmuxes of the other figures.

At 501, output from an encoder is generated. The output may be NULL or non-NULL (e.g., having video, audio, or other data).

A determination is made of how a packet header is to indicate encoder NULL output by counting consecutive null outputs at 503. This determination may take several forms. In some instances, for consecutive NULL outputs, a count the number of NULL outputs is made at 505. In some embodiments, this count is made in the encoder. In other embodiments, this count is made in a packetizer.

When the counter reaches a maximum value, a packet is modified at 507, wherein a field in the packet header of the packet encoding indicates the count of consecutive NULL outputs. The count of consecutive NULL outputs is reset.

For non-null output, a non-null payload packet is modified at 509, wherein a field in the packet header of the packet encoding indicates the count of previous consecutive NULL outputs. The count of consecutive NULL outputs is reset.

The modified packet is sent at 511.

The statmux receives a packet at 513 and determines if the generated packet includes a NULL counter value at 515. When there is no NULL counter value, the packet is added to the MPTS and the value the NULL counter value replace is restored at 517. For example, a SYNC byte is reset to 0x47. When there is a NULL counter value, that number of NULLs are inserted into the MPTS followed by the received packet and the value the NULL counter value replace is restored at 521. In the received packet the field that indicated whether there was a NULL packet is reset to a default value. In some embodiments, the indicated number of NULL packets dropped are used to recover timing information of non-NULL packets.

Figure 6:
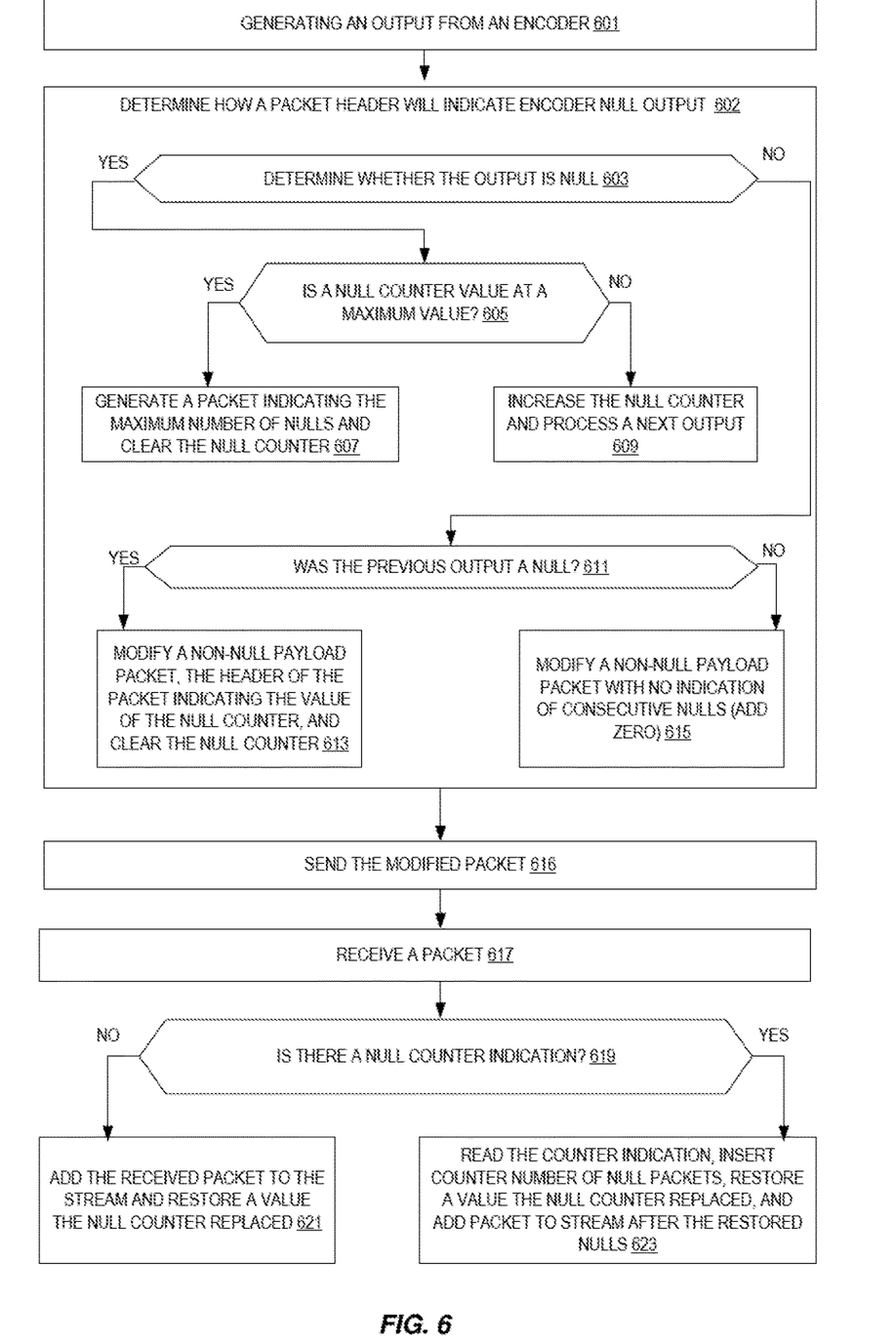
FIG. 6 is a flow diagram illustrating operations of a method for converting CBR to VBR and back to CBR.

FIG. 6 is a flow diagram illustrating operations of a method for converting CBR to VBR and back to CBR. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the media channels and statmuxes of the other figures.

At 601, output from an encoder is generated. The output may be NULL or non-NULL (e.g., having video, audio, or other data.

A determination of how a packet header is to indicate encoder NULL output by counting consecutive null outputs at 602. In some embodiments, this determination includes performing one or more actions.

A determination of whether the output is NULL is made at 603. When the output was NULL, a determination of if a NULL counter value at a maximum value as made at 605. In some embodiments, this count is made in the encoder. In other embodiments, this count is made in a packetizer.

When the NULL counter value is at a maximum value (e.g., the maximum value the SYNC byte can hold), then a packet is generated indicating the maximum number of NULLs and the NULL counter is cleared at 607. Note that the packet generated is a NULL packet.

When the NULL counter value is not maxed out, then the NULL counter value is increased at 609. The NULL output is thrown away.

When the output was determined to not be NULL at 603, a determination of if the previous output was a NULL is made at 611. When the previous output was a NULL this indicates that there was at least one NULL that was dropped. At 613, a non-NULL payload packet is modified with a header of the packet indicating that the value of the NULL counter. The NULL counter is also cleared.

When the previous output was not NULL, this indicates that there are no NULLs to account for. As such, a non-NULL payload packet is modified at 615, wherein a header of the packet does not indicate any dropped NULLs. In essence, an add packet indicating that there are zero NULLs is modified.

The modified packet is sent at 616.

The statmux receives a packet at 617 and determines if the generated packet includes a NULL counter value at 619. When there is no NULL counter value, the packet is added to the MPTS and the value the NULL counter value replace is restored at 621. When there is a NULL counter value, that number of NULLs are inserted into the MPTS followed by the received packet and the value the NULL counter value replace is restored at 623. In the received packet the field that indicated whether there was a NULL packet is reset to a default value. In some embodiments, the indicated number of NULL packets dropped are used to recover timing information of non-NULL packets.

Figure 7:
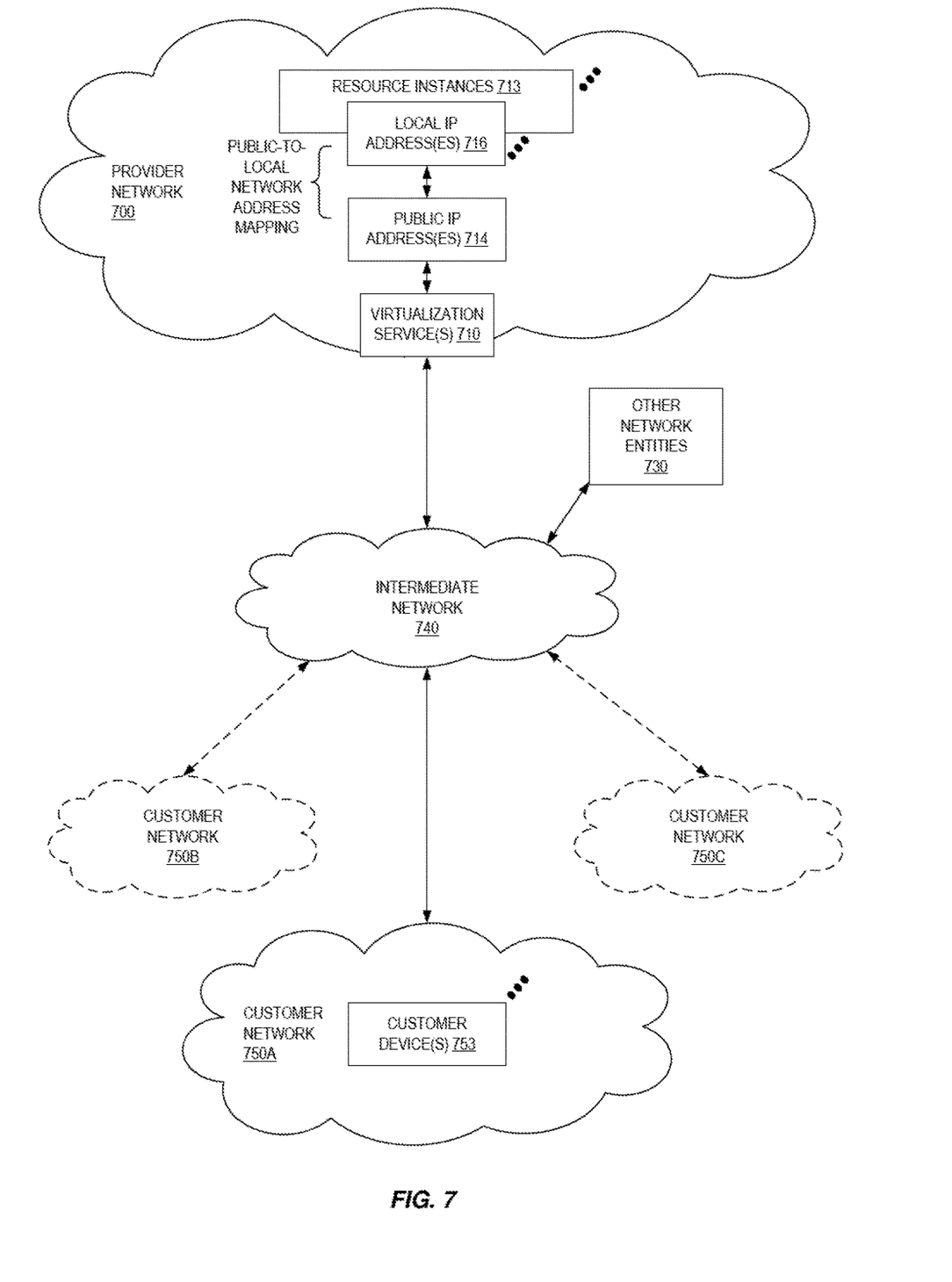
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
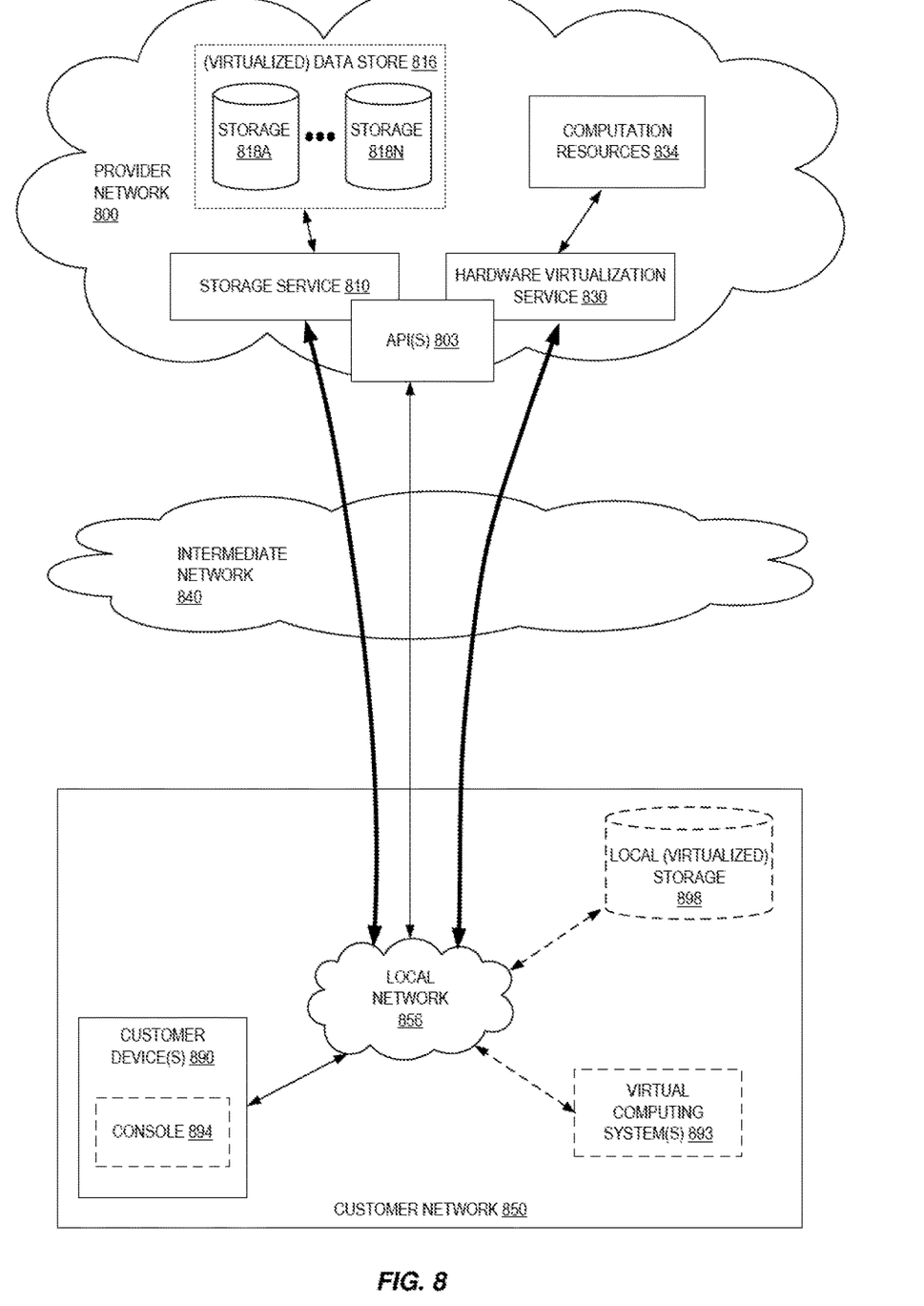
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
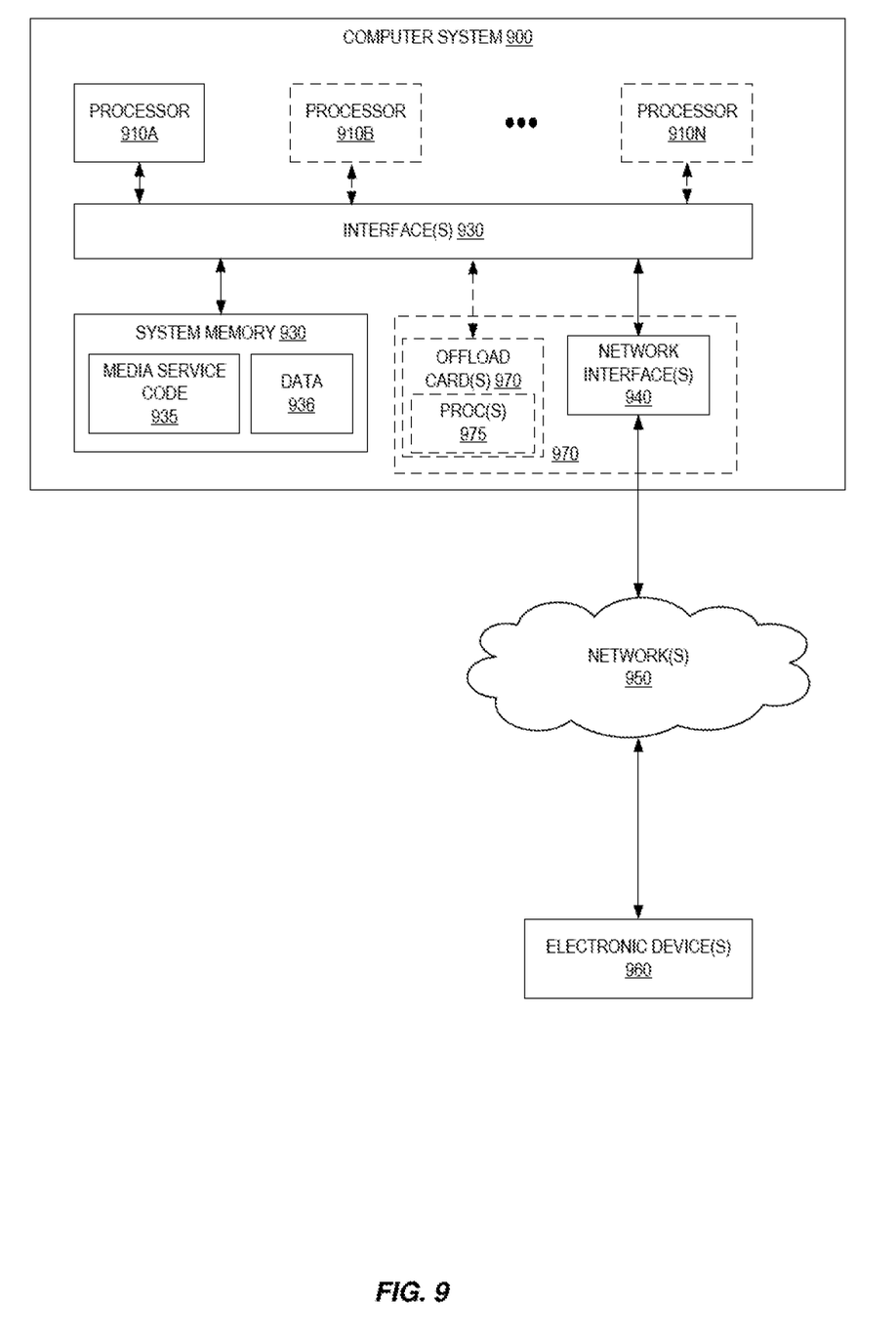
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as media service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    generating elementary stream data from an encoder;
    receiving the generated elementary stream data in a packetizer;
    generating a transport stream output in the packetizer;
    for consecutive NULL packets generated by the packetizer, counting a number of NULL packets between non-null packets and dropping those NULL packets;
    modifying a synchronization field of a header of a next packet generated by the packetizer to generate a modified next packet that indicates the number of NULL packets dropped; and
    sending the modified next packet to a receiver using the real-time transport protocol.

2. The computer-implemented method of claim 1, wherein when the consecutive null packets reach a maximum value, a count of the number of consecutive number of NULL outputs received from the encoder is reset.

3. The computer-implemented method of claim 1, further comprising:

in the receiver, adding the number of NULL packets dropped to a stream to reconstruct a constant bitrate transport stream originally created by the packetizer.

4. The computer-implemented method of claim 1, further comprising:
in the receiver, using the indicated number of NULL packets dropped to recover timing information of non-NULL packets.

5. The computer-implemented method of claim 1, wherein the transport stream output generated in the packetizer is constant bitrate.

6. The computer-implemented method of claim 1, wherein the header of the next packet as generated in the packetizer includes a program clock reference; and wherein a header of the modified next packet sent to the receiver comprises the program clock reference.

7. The computer-implemented method of claim 1, wherein the next packet as generated in the packetizer has a non-NULL payload; and wherein the modified next packet sent to the receiver comprises the non-NULL payload.

8. The computer-implemented method of claim 7, wherein the non-NULL payload is one of encoded video, encoded audio, and encoded data.

9. A system comprising:
a first one or more electronic devices to implement an audio/visual source; and
a second one or more electronic devices to implement a media service, the media service including instructions that upon execution cause the media service to:
generate elementary stream data from an encoder, the encoder to encode audio/visual content from the audio/visual source;
receive the generated elementary stream data in a packetizer;
generate a transport stream output in the packetizer;
for consecutive NULL packets generated by the packetizer, count a number of NULL packets between non-null packets and dropping those NULL packets;
modify a synchronization field of a header of a next packet generated by the packetizer to generate a modified next packet that indicates the number of NULL packets dropped; and
send the modified next packet to a receiver using the real-time transport protocol.

10. The system of claim 9, wherein the transport stream output to generate in the packetizer is constant bitrate.

11. The system of claim 9, wherein the header of the next packet to generate in the packetizer includes a program clock reference; and wherein a header of the modified next packet to send to the receiver comprises the program clock reference.

12. The system of claim 9, wherein the next packet to generate in the packetizer has a non-NULL payload; and wherein the modified next packet to send to the receiver comprises the non-NULL payload.

13. The system of claim 12, wherein the non-NULL payload is one of encoded video, encoded audio, or encoded data.

14. A non-transitory computer-readable media storing instructions which, when executed by one or more electronic devices, cause:
generating a transport stream based on counting a number of consecutive NULL packets between non-NULL packets, dropping those NULL packets from the transport stream; and including a non-NULL packet in the transport stream with a synchronization field of a header of the non-NULL packet set to indicate the number of consecutive NULL packets dropped; and
sending the transport stream to a receiver using a real-time transport protocol.

15. The non-transitory computer-readable media of claim 14, wherein the number of consecutive NULL packets is a maximum number dictated by a bit-length of the synchronization field.

16. The non-transitory computer-readable media of claim 14, wherein the instructions which, when executed by the one or more electronic devices, cause the sending the transport stream to the receiver using the real-time transport protocol comprise instructions which, when executed by the one or more electronic devices, cause:
sending the non-NULL packet in a payload of a real-time transport protocol packet.

17. The non-transitory computer-readable media of claim 14, wherein the transport stream is a moving pictures experts group (MPEG) transport stream.

18. The non-transitory computer-readable media of claim 14 further storing instructions which, when executed by the one or more electronic devices, cause:
generating the transport stream based on identifying a first non-NULL packet and a second non-NULL packet,
including the first non-NULL packet in the transport stream, and
including the second non-NULL packet in the transport stream with a synchronization field of a header of the second non-NULL packet set to a value of 0x47 to indicate that no NULL packets are dropped between the first non-NULL packet and the second non-NULL packet.

19. The non-transitory computer-readable media of claim 14, further storing instructions which, when executed by the one or more electronic devices, cause:
generating the transport stream based on identifying a first non-NULL packet and a second non-NULL packet,
including the first non-NULL packet in the transport stream, and including the second non-NULL packet in the transport stream with a synchronization field of a header of the second non-NULL packet set to a value of zero to indicate that no NULL packets are dropped between the first non-NULL packet and the second non-NULL packet.

* * * * *